March 24, 1959 F. E. STIRN ET AL 2,878,630
MACHINE FOR STRIPPING CAPSULES
Filed Dec. 13, 1954 3 Sheets-Sheet 2
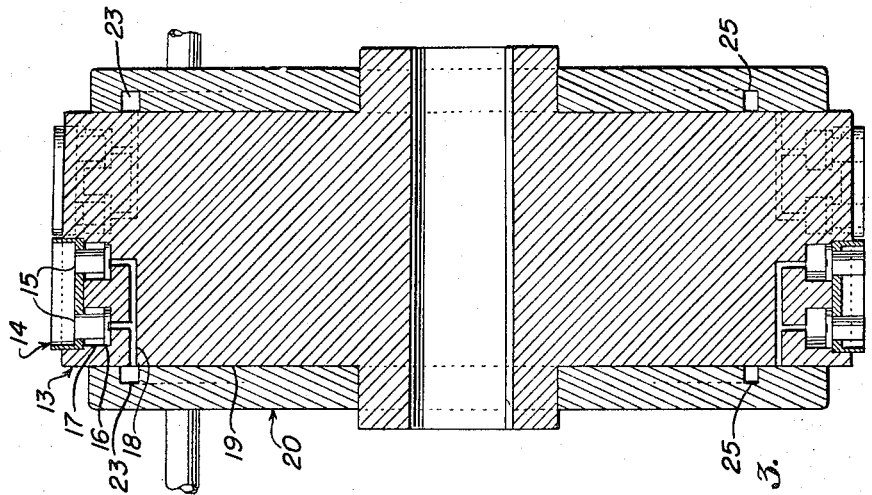
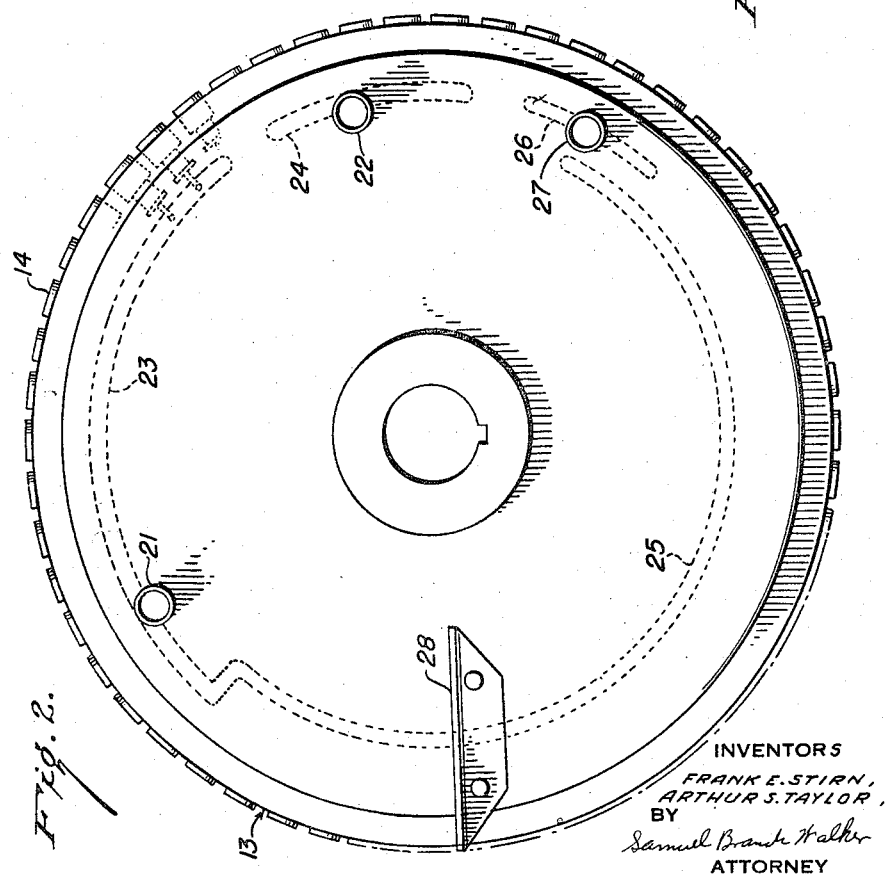
INVENTORS
FRANK E. STIRN,
ARTHUR S. TAYLOR,
BY
ATTORNEY March 24, 1959　　F. E. STIRN ET AL　　2,878,630
MACHINE FOR STRIPPING CAPSULES
Filed Dec. 13, 1954　　3 Sheets-Sheet 3

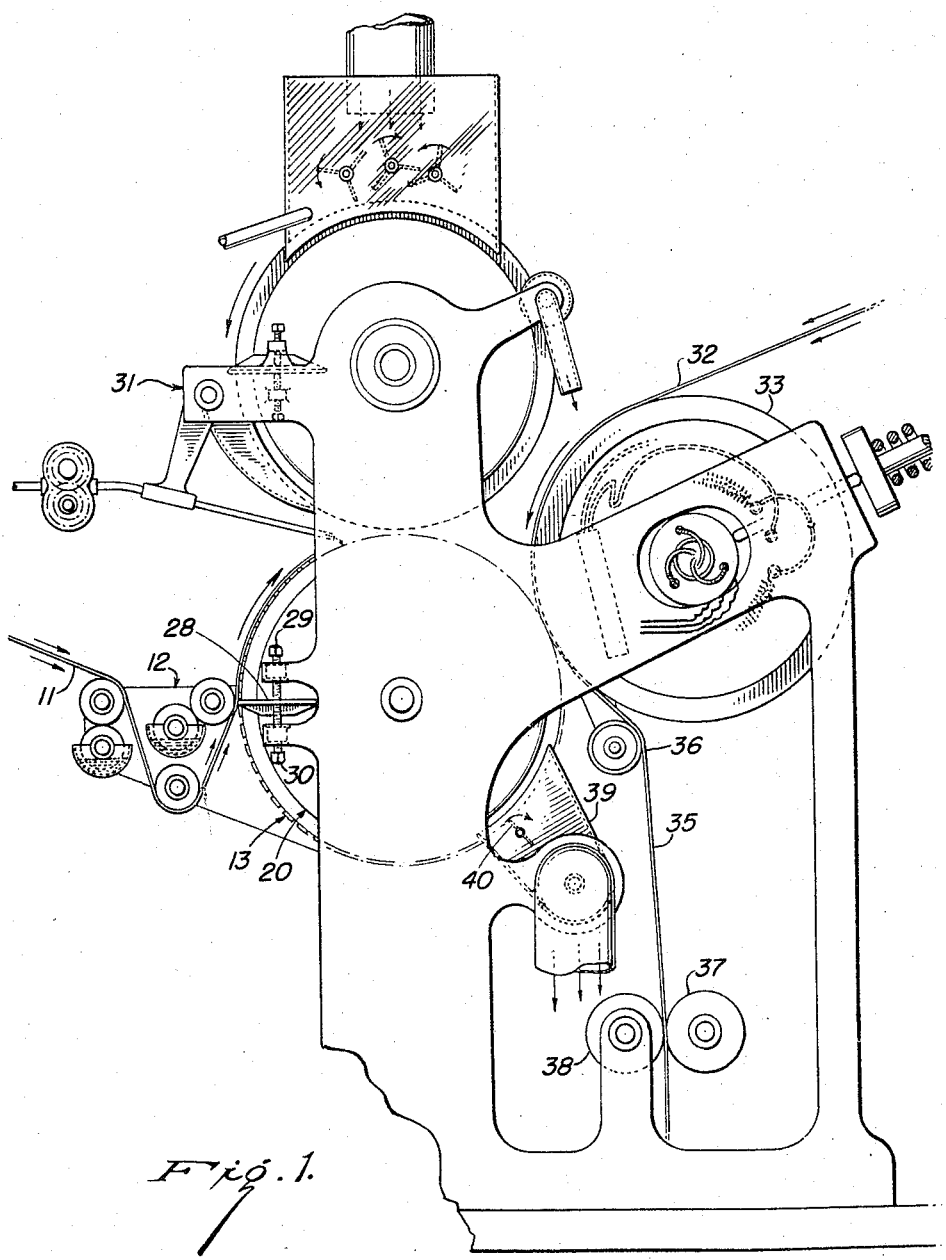

INVENTORS
FRANK E. STIRN,
ARTHUR S. TAYLOR,
BY
ATTORNEY

United States Patent Office 2,878,630
Patented Mar. 24, 1959

2,878,630

MACHINE FOR STRIPPING CAPSULES

Frank Edwin Stirn, Monsey, and Arthur Sinclair Taylor, Spring Valley, N.Y., assignors to American Cyanamid Company, New York, N.Y., a corporation of Maine Application December 13, 1954, Serial No. 474,802

6 Claims. (Cl. 53—182)

This invention relates to improvements in a machine for stripping capsules made from deformable plastic strip material, such as soft gelatin, from the webs in which they are formed. It relates more particularly to a machine in which the completed capsules are formed and cut out between a cavity die roll and a contacting seal roll, and the residual web and the capsules are caused to follow separate definite paths as they leave the forming cavity die roll and seal roll.

This application is a continuation-in-part of our copending application, Serial Number 399,130, filed December 18, 1953, entitled Capsule Forming Die-Roll, now Patent Number 2,697,317, dated December 21, 1954, which application is in turn a continuation-in-part of application Serial Number 16,554, filed March 23, 1948, entitled Method and Machine for Making Capsules, now Patent Number 2,663,128, dated December 22, 1953; and application Serial Number 164,426, filed May 26, 1950, entitled Method and Apparatus for Forming Combination Filled Capsules, now Patent Number 2,775,080, dated December 25, 1956.

Capsules are formed from deformable plastic strip material which is pressure sealable to itself by cutting through two sheets of the material whereby the edges are joined. Soft gelatin preparations using a mixture of gelatin, water, glycerin and perhaps dyes, flavors and other plasticizers, are most commonly in use for this purpose at the present time, although other materials may be used.

After cavities in the plastic strip are filled, covered and cut out around the peripheries thereof to form capsules, the finished capsules must be separated from the residual web. Unfortunately, in general, in the formation of such capsules, the cutting out is not perfect because of difficulties in getting the cutting out die edges to cut completely through the web and completely sever the filled capsules from the residual web. In most instances, because of minor imperfections in the die edges and for other reasons there is at times a certain retention through thin edges or feathers of deformable plastic strip material which holds the capsules in the web.

The problem of separating the capsules from the filled web has challenged inventors for some time. A patent, 2,296,294 to R. P. Scherer, entitled Capsule Stripping Apparatus, September 22, 1942, is drawn to an apparatus in which rotatable stripping elements on opposite sides of the band, driven counter to the direction of travel of the band, throw the capsules out of the web. A patent, 2,561,900 to C. C. Alvord, Feed, Take-up, and Stripper Mechanism for Encapsulating Machines, July 24, 1951, shows a different approach to the problem in which stripper bars oscillate on each side of the capsule containing web to disengage the capsules from the residual web. A patent, 2,561,942 to R. E. Moule, Stripper Mechanism for Encapsulating Machine, July 24, 1951, also shows a system in which oscillating stripper bars adjacent to the capsule containing residual web are used to assist in separating the capsules. Another patent, 2,581,874 to R. E. Moule, Stripper Mechanisms for Encapsulating Machines, January 8, 1952, shows a series of paddles adjacent to the network that moves in the same direction as the web to remove capsules therefrom. In the past, the art seems to have predicated the problem of stripping upon the assumption that it was a diverse problem from the problem of capsule formation so that the capsules were first formed in the web, and then separately stripped.

We find that by using the forming die roll as part of the stripping mechanism, it is convenient to have the web and the capsules follow divergent paths as they leave the die roll itself in which the capsules are formed so that the capsules are never released from control but are actually positively maintained in a fixed position up until the separation of the capsules from the web, thereby giving better control than has previously been accomplished. In the past, it was common to release the capsule containing web and then attempt to bring it under positive control. In contradistinction thereto, the present method revolves around the principle that by keeping the capsules in the forming cavity die roll, they are under positive control and stripping is markedly simplified thereby.

Our method of stripping is of particular utility with cavity die rolls containing cavities which are deeper than the semi-diameter of the finished capsule and in which the capsules are formed. By using an asymmetric die roll system having the capsule forming cavity deeper than the semi-diameter of the capsule, it is easier to retain them in the cavity by suction or to manipulate them as may be desired during the stripping operation. Our method of stripping capsules from the web is also particularly advantageously used with cavity die rolls in which positively operated plugs rise within the capsule forming cavity to partially eject the capsules therefrom at a desired point of the peripheral travel of the cavity die roll. Certain die rolls of this nature are described in our copending application, Serial Number 399,130, above referred to. It is a further advantage of our invention to provide a means whereby the capsules, as separated from the cavities in the cavity die roll in which they are formed, are uniformly and completely ejected without being allowed to be retained in the plastic strip material web which is residual. Upon being ejected, the capsules may be picked up in an air conveyor system or other apparatus whereby they are transferred rapidly and uniformly to a desired location. Coincidentally, our method of removing capsules from the web does have the additional advantage of testing the strength of the seal.

Figure 1 is an elevation of a capsuling filling machine. One modification of the method for stripping capsules is shown in this figure.

Figure 2 is an elevation in detail of a cavity die roll which may be used for the present invention.

Figure 3 is a sectional view through a cavity die roll of a type which may be used with the present invention.

Figure 4:
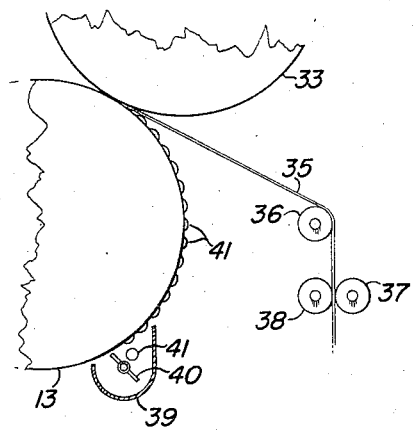
Figure 4 shows diagrammatically the path of the web as it is drawn from between a cavity die roll and a sealing roll with the capsules being retained in the cavity die roll.

The size and shape of the completed capsule is a matter within the discretion of the operator. The capsules may be round, elliptical or the so-called long oval, that is, a cylindrical portion with two hemispherical ends. The method of separating the capsules and the web by retaining the web against the face of the cavity die roll and ejecting the formed capsules from the cavities in the die roll and simultaneously the web, is particularly advantageously used with very small capsules. The maximum holding action that can be obtained by the use of vacuum is sharply limited at approximately 15 pounds per square inch and particularly with small capsules, the web may be tough enough to pull part of the capsules out of the forming cavities if the web is stripped first. With larger capsules, it is also convenient to hold the capsules in the forming cavities by vacuum and draw the web away first so that only the capsules remain with the cavity die roll at the point where they are ejected.

The capsules may be filled with powder, liquid or powder and liquid, or the powder may be in part pressed and solidified and fed as a slug into the plastic strip material lined capsule forming cavities. Such methods of filling and forming the capsules are not part of the present invention.

The description of the encapsulation machine itself is rather short inasmuch as the present method of stripping capsules from the residual web may be used with other forms of capsuling machines, but is given principally for purposes of illustrations.

In Figure 1, a lower plastic strip 11 is passed through an oiler and coater 12, onto a cavity die roll 13. The cavity die roll may be of the form described in our copending application, Serial Number 399,130, above referred to. As shown in Figure 3, the cavity die roll has in its periphery a series of capsule forming cavities 14. Located within the capsule forming cavities are capsule ejector plugs 15. The capsule ejector plugs are positioned by a capsule ejector piston 16. The pistons slide in a capsule ejector piston cylinder 17. The pressure in the cylinders under the pistons is controlled by gaseous flow through a manifold 18. The manifold leads to a valve seat surface 19. Adjacent valve seat surface is a valve plate 20. In the valve plate, as shown in Figure 2, two vacuum lines connect with two vacuum chests. The vacuum connections 21 and 22 control the pressure in the vacuum chests 23 and 24. One vacuum chest 23 connects to a balancing chamber 25 so as to give a balanced action of the vacuum around the valve plate and to hold the plate smoothly against the surface of the cavity die roll throughout its entire periphery. The valve plate may be of molded plastic such as Micarta, or of metal.

The first vacuum chest 23 controls the ejector plugs during the filling operation. There is a gap between the two vacuum chests, so that there is no vacuum acting on the strip at the time of formation of the seal. At the ejection point there is a pressure chest 26 connected to a pressure line 27. Air pressure raises the plugs to the top of their travel, thereby ejecting the formed capsules, and causing their release from the cavity die roll. In operation, the valve plate is prevented from rotating by a valve plate positioning bracket 28. This bracket consists of an angle extending from the plate. It is anchored between two screws 29 and 30, which serve as an upper valve plate positioning screw and a lower valve plate positioning screw whereby the angular position of the valve plate may be micrometrically adjusted.

In operation, the strip after being coated passes adjacent to and rests upon the raised rims of the capsule cavity inserts. When the openings of the manifold 18 come in contact with the vacuum chests 23, the vacuum pulls down the pistons, the plugs, and because of the loose fit, the the entire strip. Air pressure forces the strip down into the capsule cavity and the piston is drawn down against the bottom of its cylinder.

The thus formed plastic strip lined cavity is filled. A filling device 31 is shown diagrammatically. Any of the some several types of fillers may be used.

Figure 5:
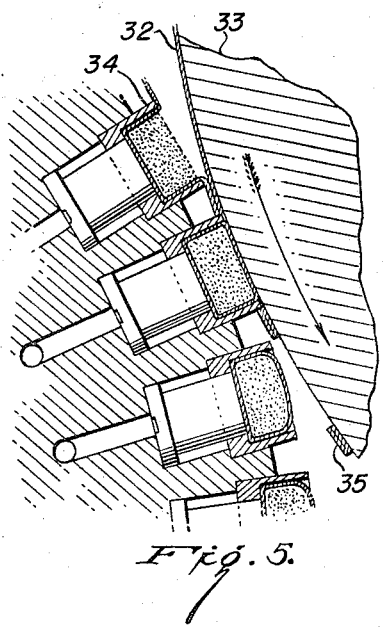
Figure 5 is a partial sectional view through a cavity die roll and a sealing roll showing the sealing action occurring at a point where the strips come together, and the residual web is stripped from the cavity die roll and is retained against the sealing roll as the capsules is formed and cut out.

The filled cavity rotates around. Adjacent to the cavity die roll is a seal roll 33. A cover strip 32 is fed over the seal roll and the seal roll and the die roll approach a line of tangency. The cover strip moves down against the filled capsule cavity as the two rolls approach the line of tangency and as the two rolls come into contact with each other, the capsule contents are first isolated and then the cutting out rims are forced through the two layers of plastic strip and because of the characteristics of the strips, cuts into them, effectively severing them and also causes the two strips to unite with each other. This gives a uniform seal around the periphery of the thus formed capsules. This operation is shown in Figure 5. As each capsule passes beyond the line of tangency of the rolls, the filled formed capsules remain in the capsule forming cavities and the residual web may be treated separately. The residual web 35 consists of the remainder of the two plastic strips from which the capsules have been cut out. The two perforated strips forming the web are united around the peripheries of the cut out holes.

The residual web may be either separated from the cavity die roll at this point while the capsules are retained in the capsule forming cavities, or the residual web may be drawn against the surface of the cavity die roll and retained there until the capsules themselves are separately ejected and sent on their own path and then the web removed.

The first modification in which the residual web is drawn away from the cavity die roll after the capsules are cut out and formed and in which the residual web may be retained against the surface of the sealing roll, is shown in Figures 1, 4, and 5. The web can be drawn off at a later point, provided it is separated from the capsules before their ejection.

As shown in Figures 2 and 3, the vacuum chest 24 connects with the manifold 18 shortly after the die cavities pass the point of cutting out and sealing. The cavities are evacuated so that the capsules are pulled against the bottom of the capsule forming cavities as shown in Figure 5. The residual web is shown against the surface of the seal roll. As shown in Figures 1 and 4, the residual web is run over an idler roll 36 and then between take off rolls 37 and 38, and from there to discard or recovery operations. The take off rolls are preferably driven at a substantially higher surface speed than is the die roll and seal roll so that the web is stretched, assisting in causing the complete and smooth separation of the residual web from the capsules. As shown in Figure 4, the capsules are retained in the forming cavities until they are within the confines of the shield 39. Air pressure in the pressure chest 26 causes the capsules to be ejected from the forming cavities and a rotating stripper 40 aids in knocking the capsules out of the cavities. The rotating stripper consists of a flexible member such as nylon, or polytetrafluorethylene or canvas which knocks the capsules away from the die roll. If the stripper is run counter to the rotation of the die roll, it tends to throw the capsules back and aids in preventing them from binding between the die roll and the bottom part of the shield. A speed of 1000 revolutions per minute has proved very effective. The stripper may be rotated in either way with success. For purposes of convenience, the capsules may be removed from the bottom of the shield by a pneumatic conveyor using a high speed air blast to pick up the capsules and transfer them to the location in which they are to be next treated.

Figure 6:
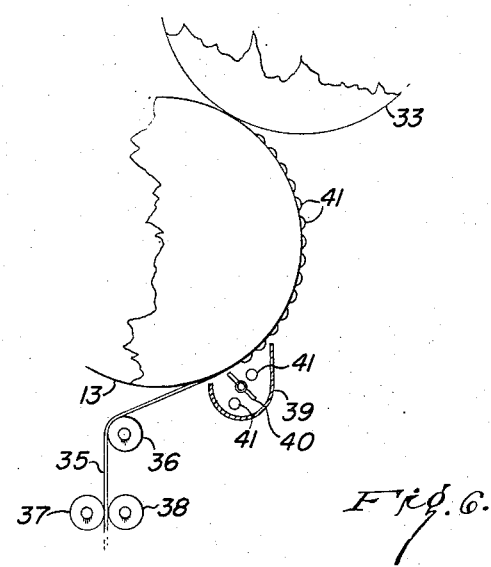
Figure 6 is a diagrammatic view of a cavity die roll and a seal roll showing the residual web being retained against the face of the cavity die roll until after the capsules have been removed from the cavity die roll and concurrently separated from the web.
Figure 7:
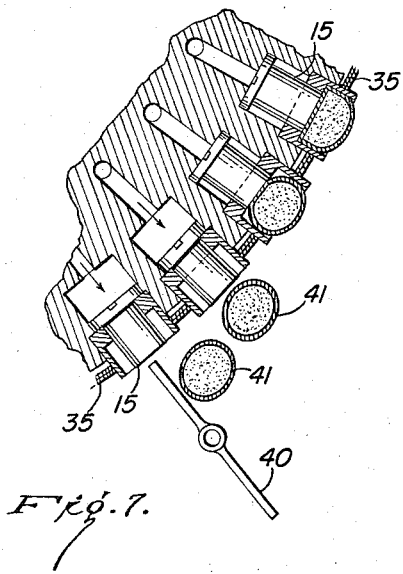
Figure 7 is a partial sectional view of the cavity die roll at the point where the capsules are being removed therefrom showing the residual web being retained against the face of the cavity die roll.

A second modification is shown in Figures 6 and 7. As shown in Figure 6, the capsules are retained against the bottom of the forming cavities as the roll rotates. The residual web 35 is held against the surface of the die roll by tension applied in the direction of travel of the die roll by an idler roll 36 and take off rolls 37 and 38. The web 35 thus being positively retained, air pressure is used to eject the individual capsules as shown in Figure 7. The individual capsules 41, are driven out of the forming cavities by the capsule ejector plugs 15, rising and ejecting the capsule. The stripper 40 strikes the capsules and causes them to be released. Otherwise some of them might be retained against or stick to the surface of the die roll. The stripper may be rotated in the same direction as the die roll or against the direction of the die roll. With smaller capsules particularly, it is convenient to make the stripper rotate against the direction of the die roll, called counter rotation, as it thereby causes the capsules to be displaced against the upper part of the shield and aids in preventing them from being trapped between the shield and the rotating die roll. As shown in Figure 6, the idler roll 36 and the take off rolls 37 and 38 draw the residual web away from the die roll after the capsules have been separated.

By causing the individual capsules and the residual web to follow separate courses as they leave the point of cutting out and sealing, and by maintaining the capsules under positive control in the forming cavities, it is possible to achieve a degree of separation and the convenience of handling not previously known.

Our method is particularly effective with die rolls in which the depth of the individual cavities is greater than the half diameter of the capsules. The present method may be used with a symmetrical die system, but because with symmetrical systems each die roll has the same depth, there is a tendency for the capsules to escape from the dies so that as the vacuum is again applied to pull the capsules down into the dies, they are not firmly and positively seated, so there is a chance of loss of certain capsules; however, with a deeper die, as is used in an unsymmetrical roll system, as shown in Figures 5 and 7, the cavity die itself is deep enough so that the capsule does not escape therefrom and tends to press out against the rim of the die so that when vacuum is reapplied, it is drawn smoothly and firmly down into the capsule forming die cavity and is thus more easily and positively retained in the cavity until the capsule reaches the point at which the discharge of the capsule is desired.

Other modifications within the scope of this invention will be apparent to those skilled in the art, as the modifications shown are by way of example and the claims define our invention.

We claim:

1. The combination with a rotatable cavity die roll of an apparatus for separating capsules disposed in cavities in said die roll from a residual web on the surface of said die roll, said apparatus comprising: take-off means positioned to draw the residual web away from the surface of the rotating die roll at a predetermined point, and means to eject the capsules from the die roll cavities at a different point and thereby cause said capsules to follow a separate definite path.

2. The combination with a rotatable cavity die roll of an apparatus for separating capsules disposed in cavities in said die roll from a residual web on the surface of said die roll, said apparatus comprising: take-off means positioned to draw the residual web away from the surface of the rotating die roll at a predetermined point, vacuum means to retain the capsules in the cavities in the cavity die roll while said web is being withdrawn, and means to eject the capsules from the die roll cavities at a later point and thereby cause said capsules to follow a separate definite path.

3. The combination with a rotatable cavity die roll of an apparatus for separating capsules disposed in cavities in said die roll from a residual web on the surface of said die roll, said apparatus comprising: take-off means positioned to draw the residual web away from the surface of the rotating die roll at a predetermined point, vacuum means to retain the capsules in the cavities in the cavity die roll while said web is being withdrawn, air operated means to eject the capsules from the die roll cavities at a later point, and a counter-rotating stripper at said point of capsule ejection to aid in removing the capsules from the cavities, and thereby cause said capsules to follow a separate definite path.

4. In a capsule forming die roll system comprising a cavity die roll having therein evacuable capsule forming cavities and a contacting seal roll between which capsules are sealed and cut out from plastic strip material, the improvement which comprises: take-off rolls positioned to retain the residual web against the cavity die roll until after the capsules are separated therefrom, and means to eject the capsules from the forming cavities and thus positively separate them from the residual web while said web is held against the die roll.

5. The apparatus of claim 4 in which the means to eject the capsules from the die roll cavities includes a rotating stripper which hits the capsules as they are ejected from the forming cavities.

6. In a capsule forming die roll system comprising a cavity die roll having therein evacuable capsule forming cavities and a contacting seal roll between which capsules are sealed and cut out from plastic strip material, the improvement which comprises: take off rolls positioned to retain the residual web against the face of the cavity die roll until after the capsules are separated therefrom, means to eject the capsules from the forming cavities, and a counter rotating flexible stripper adjacent to the point of ejection of the capsules from the forming cavities, to aid in separating the capsules from the die roll.

References Cited in the file of this patent

UNITED STATES PATENTS

| | | |
|---|---|---|
| 2,152,101 | Scherer | Mar. 28, 1939 |
| 2,323,582 | Weckesser | July 6, 1943 |
| 2,490,781 | Cloud | Dec. 13, 1949 |
| 2,497,212 | Donofrio | Feb. 14, 1950 |
| 2,624,164 | Donofrio | Jan. 6, 1953 |
| 2,697,317 | Stirn et al. | Dec. 21, 1954 |
| 2,775,081 | Stirn et al. | Dec. 25, 1956 |